United States Patent [19]

Inoue et al.

[11] 4,051,501
[45] Sept. 27, 1977

[54] BUILT-IN SELF-TIMER FOR CAMERAS

[75] Inventors: Nobuyoshi Inoue, Kawagoe; Toshihisa Saito, Tokyo, both of Japan

[73] Assignee: Copal Company Limited, Japan

[21] Appl. No.: 700,183

[22] Filed: June 28, 1976

[30] Foreign Application Priority Data

June 26, 1975 Japan .............................. 50-90368
Dec. 22, 1975 Japan .............................. 50-173845

[51] Int. Cl.² .............................................. G03B 9/64
[52] U.S. Cl. ..................................... 354/239; 354/240
[58] Field of Search ................................ 354/239, 240

[56] References Cited

U.S. PATENT DOCUMENTS 3,103,862  9/1963  Kiper et al. ......................... 354/239
3,209,665  10/1965  Ebeil ................................ 354/239

FOREIGN PATENT DOCUMENTS 1,135,749  8/1962  Germany ............................ 354/239

Primary Examiner—Edna M. O'Connor
Attorney, Agent, or Firm—Cushman, Darby & Cushman

[57] ABSTRACT

A built-in self-timer for cameras comprising a cocking member movable to the uncocked position and cocked position, a sector gear engageable with said cocking member and capable of being brought to the cocked position from the uncocked position by the cocking member, a checking member engageable with an interlocking member and capable of locking in the cocked position a delaying gear train meshed with the sector gear, and a locking member engaged with the checking member and engageable with the cocking member and interlocking member so that, even after the self-timer is set in the using state, if the cocking member is returned to the uncocked position, the delaying gear train may be automatically returned to the uncocked position and, at the same time, the checking member and locking member may be moved to a position of not engaging with the interlocking member.

2 Claims, 5 Drawing Figures

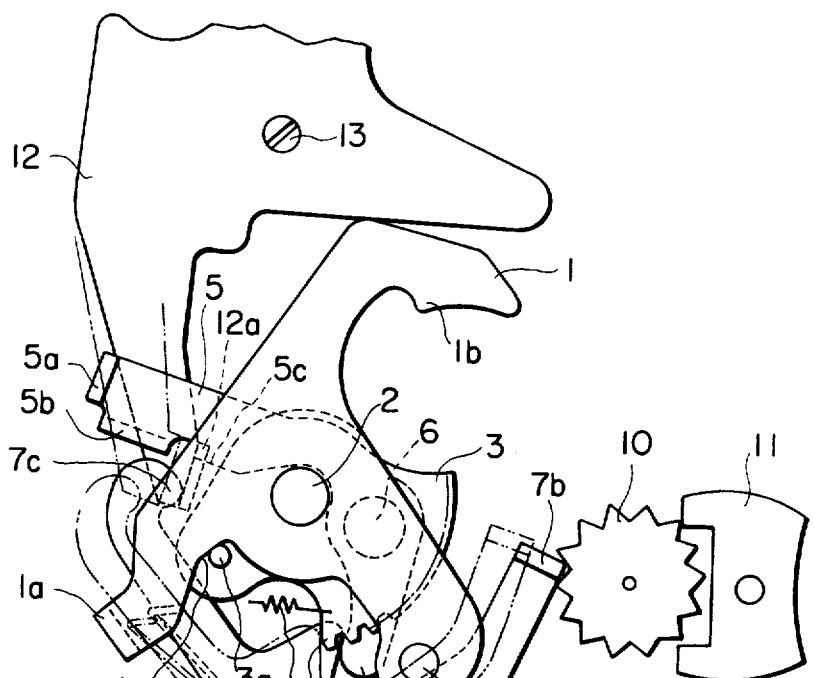
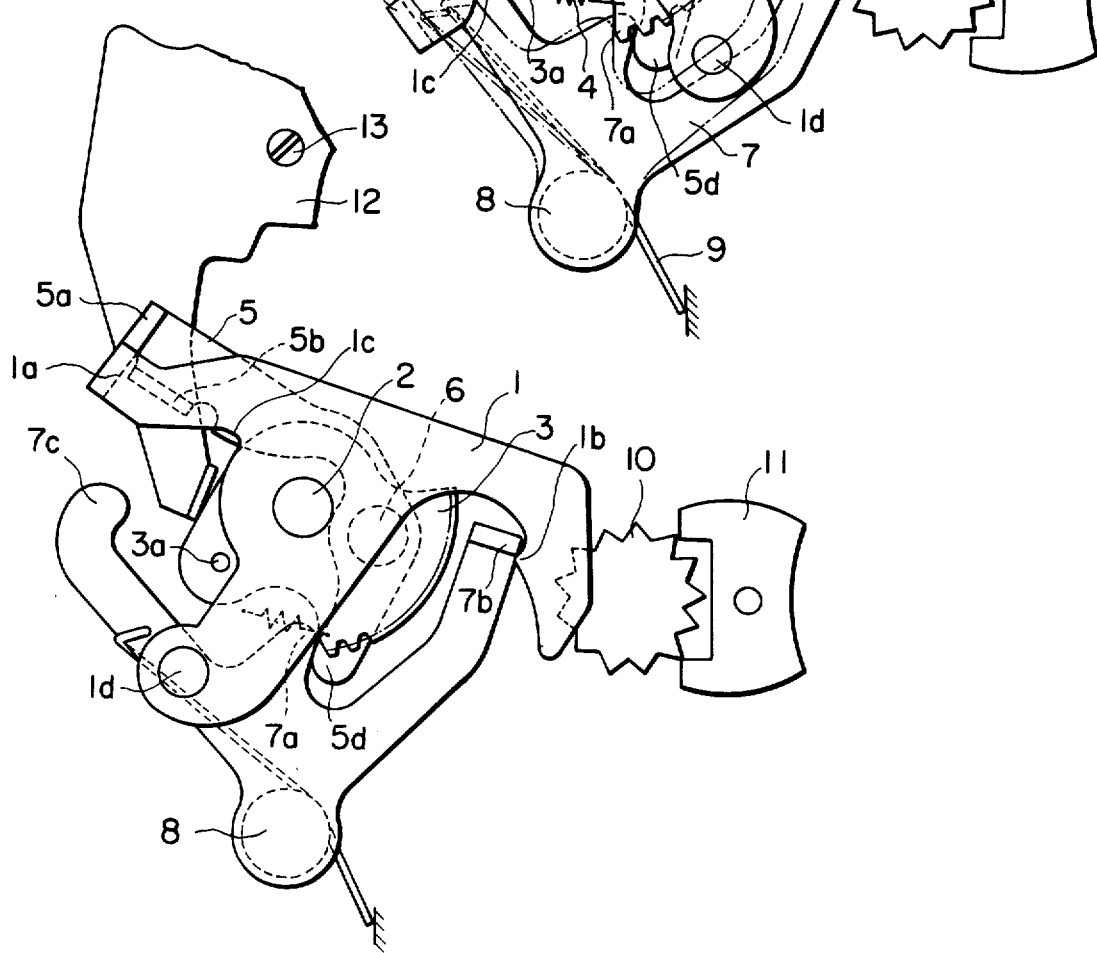

BUILT-IN SELF-TIMER FOR CAMERAS

BACKGROUND OF THE INVENTION

1. Field of the Invention

The present invention relates to a self-timer for cameras and more particularly to a self-timer device of a type built in a camera.

2. Description of the Prior Art.

There are already used self-timer devices of types built in cameras wherein, with the start of the operation by the initial motion of a shutter blade (or curtain) driving member started by the operation of a shutter button, the motion of the above mentioned driving member will be once stopped and, after the lapse of a predetermined time, it will be resumed and wherein, when a self-timer starting button provided separately from a shutter button is operated, the operation will be started and, after the lapse of a predetermined time, a member operatively connected with the shutter button will be operated to start the shutter blade (or curtain) driving member.

In the case of photographing with a camera provided with such self-timer device, when it is immediately desired to make an ordinary photographing without using the self-timer after the self-timer is set in the using state, there will be the following respective defects in both of the above mentioned types. That is to say, in the former, once the self-timer is set, the using state of the self-timer will not be able to be released without passing through the shutter opening sand closing operation. That is to say, as the shutter will not be able to be operated while the self-timer is operating, the photographing chance will be missed. In the latter, an ordinary photographing will be able to be immediately made by manually operating the shutter button but, in order to release the self-timer, the shutter will have to be cocked again and the shutter opening and closing operation will have to be made. That is to say, in order to release the self-timer, one frame of the film will have to be wasted.

SUMMARY OF THE INVENTION

A primary object of the present invention is to provide a self-timer device of a type built in a camera wherein, even after a self-timer is set in the using state by rotating a cocking member to the cocked position, when this cocking member is only returned to the uncocked position, an ordinary photographable state without using the self-timer will be able to be immediately made and, at the same time, the set state of the self-timer will be able to be automatically released.

Another object of the present invention is to provide a self-timer formed so that a cocking member may be operated smoothly without a blacklash.

DESCRIPTION OF THE DRAWINGS

FIG. 2 is a plan view of an essential part in case the self-timer device shown in FIG. 1 is in the cocked state;

FIG. 3 is a plan view of an essential part in case the cocking member is returned to the uncocked position from the state shown in FIG. 2;

DESCRIPTION OF THE PREFERRED EMBODIMENTS

Figure 1:
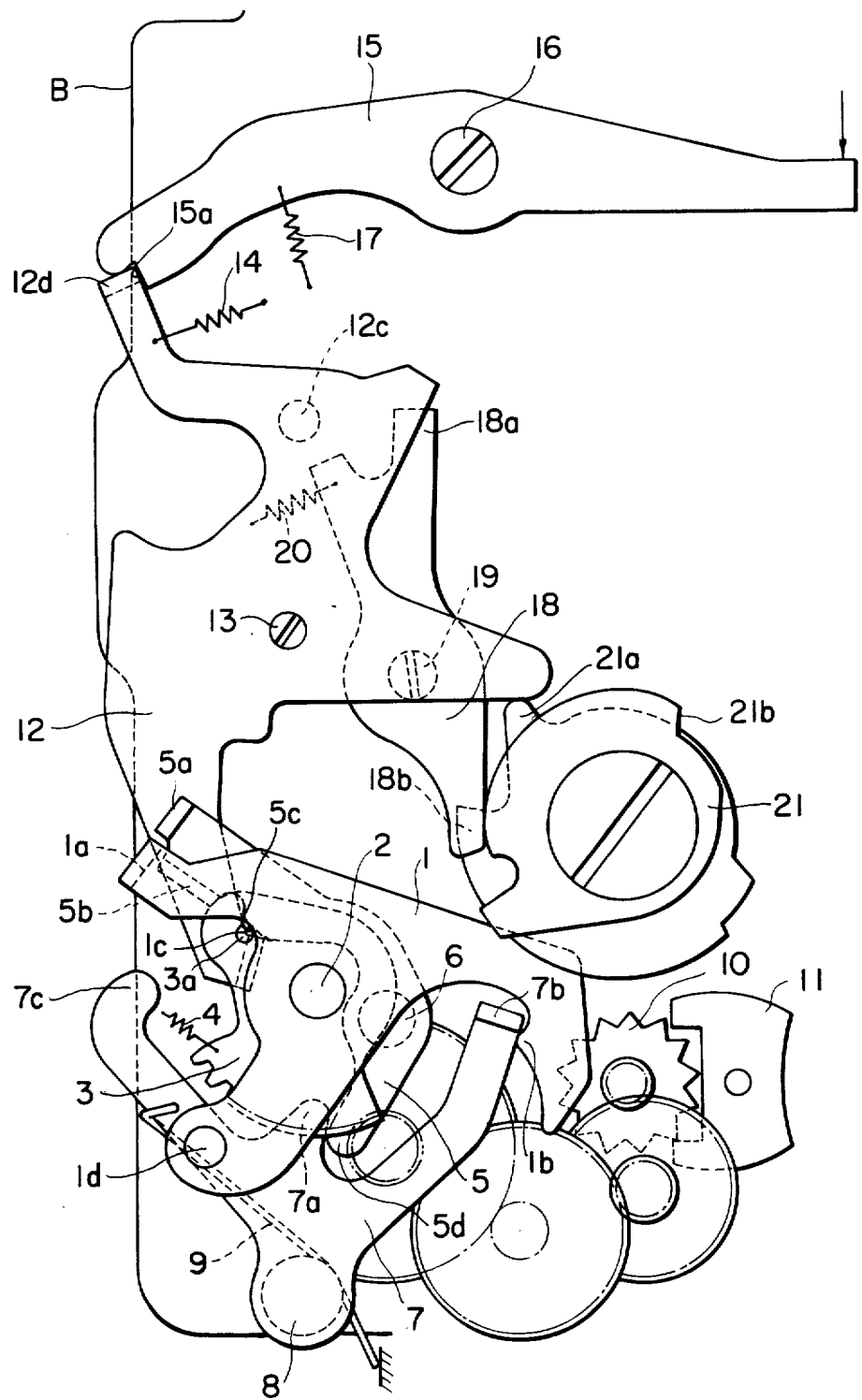
FIG. 1 is a plan view of an embodiment of the self-timer device according to the present invention in the uncocked state.

In FIG. 1, reference numeral 1 designates a three-branched cocking member supported rotatably by a shaft 2 provided on a base plate B and having a bent portion 1a, locking portion 1b, side surface 1c, and pin 1d, numeral 3 designates a sector gear supported rotatably by the shaft 2 and having a pin 3a engageable with the side surface 1c of the cocking member 1, numeral 4 designates a spring resiliently pressing the sector gear 3 clockwise, numeral 5 designates a locking member supported rotatably by a shaft 6 provided on the base plate B and having a bent portion 5a engageable with the bent portion 1a of the cocking member 1, another bent portion 5b and a side surface 5c engageable with the pin 3a of the sector gear 3, numeral 7 designates a checking member supported rotatably by a shaft 8 provided on the base plate B and having a projected portion 7a engaging with one arm end 5d of the locking member 5 and a bent portion 7b engageable with the locking portion 1b of the cocking member 1, numeral 9 designates a spring resiliently pressing the checking member 7 clockwise, numeral 10 designates a star gear supported rotatably on the base plate B and connected with the sector gear 3 through a plurality of intermediate gears, and numeral 11 designates an anchor supported rotatably on the base plate B and meshed with the star gear 10. The gear train from the sector gear 3 to the star gear 10 serves as a delaying device for earning the operating time of the self-timer in cooperation with the anchor 11. The checking member 7 is so arranged that, when it is rotated clockwise from its position shown in FIG. 1, the bent portion 7b may engage with the star gear 10 to stop its rotation. Further, a well known clutch mechanism is incorporated in the above mentioned gear train so that, when the sector gear 3 is rotated counterclockwise in FIG. 1, the sector gear 3 may be rotated with a light force without rotating the star gear 10 and, when the sector gear 3 is rotated clockwise, the star gear 10 may be also rotated and the rotating motion of the sector gear 3 may be delayed. By the way, the cocking member 1 is so made as to be movably integrally with the sector gear 3 only at the time of the counterclockwise rotation and to be movable independently of the sector gear 3 at the time of the clockwise rotation.

Reference numeral 12 designates an interlocking member supported rotatably by a shaft 13 provided on the base plate B and having a bent portion 12a capable of coming into a position of engaging with the bent portion 5b of the locking member 5 and the one arm end 7c of the checking member 7, a projected portion 12b, pin 12c and bent portion 22d. Numeral 14 designates a spring resiliently pressing the interlocking member 12 clockwise. Numeral 15 designates a release lever supported rotatably by a shaft 16 provided on the base plate B and having a hook portion 15a engageable with the bent portion 12d of the interlocking member 12. Numeral 17 designates a spring for resiliently pressing the release lever 15 couterclockwise. Numeral 18 designates a locking lever supported rotatably by a shaft 19 provided on the base plate B and having an arm 18a engageable with the pin 12c of the interlocking member 12. Numeral 20 designates a spring for resiliently pressing the locking lever 18 counterclockwise. Numeral 21 designates a shutter blade (or curtain) driving member fitted rotatably on the base plate B and having a projection 21a engageable with the projecting portion 12b of the interlocking member 21 and a step portion 21b engageable with the other arm end 18b of the locking lever 18. The driving member 21 is resiliently pressed clockwise by a spring not illustrated so as to be rotated counterclockwise from the illustrated position by the shutter cocking operation and to be locked in its cocked position by the locking lever 18. The interlocking member 12 is so arranged that, when the self-timer is set in the using state, that is to say, only when the locking member 5 is rotated counterclockwise by following the counterclockwise rotation of the sector gear 3, the bent portion 5b and one arm end 7c of the checking member 7 may engage with the bent portion 12a.

The operation of the above mentioned device shall be explained in the following.

First of all, the case of an ordinary photographing using no self-timer shall be explained. In this case, as shown in FIG. 1, due to the tendency of the sector gear 3 to rotate clockwise, the pin 3a fixed to the sector gear 3 will push the side surface 1c of the cocking member 1 and the side surface 5c of the locking member 5 to hold the cocking member 1 and locking member 5 in the illustrated positions. On the other hand, the end portion 5d of the locking member 5 will push the projected portion 7a of the checking member 7 and will hold the checking member 7 in a position rotated counterclockwise against the spring 9. Therefore, the bent portion 5b of the locking member 5 and the end portion 7c of the checking member 7 will be placed outside the moving track of the bent portion 12a of the interlocking member 12. On the other hand, by the cocking operation of the shutter, the driving member 21 will be rotated counterclockwise from the illustrated position and the step portion 21b will be engaged with the end portion 18b of the locking lever 18 so that the shutter may be cocked. Thus, when the shutter button not illustrated is operated and the release lever 15 is pushed in the direction indicated by the arrow in FIG. 1 against the spring 17, the hook portion 15a will be disengaged from the bent portion 12d of the interlocking member 12 and therefore the interlocking member 12 will be rotated clockwise around the shaft 13 without having its bent portion 12a obstructed by the bent portion 5b of the locking member 5 and the end portion 7c of the checking member 7. In the final stage of this clockwise rotating motion of the interlocking member 12, the pin 12c will collide with the arm 18a of the locking lever 18 to rotate the locking lever 18 clockwise around the shaft 19. Therefore, the driving member 21 will be released and the shutter blade or shutter curtain not illustrated will be opened and closed to finish one exposing operation. At the last of the clockwise rotating motion of the driving member 21, the projection 21a will push the projected portion 21b of the interlocking member 12 and therefore the interlocking member 12 will be returned to the state shown in FIG. 1.

Next, the case of photographing by using the self-timer shall be explained. The operation of cocking the self-timer is made by rotating the cocking member 1 counterclockwise from the position shown in FIG. 1 by a predetermined amount. The cocking member 1 is rotated by operating from outside the camera the operating member combined integrally with it through the pin 1d. When the cocking member 1 is rotated counterclockwise around the shaft 2 as described above, the side surface 1c will push the pin 3a, therefore the sector gear 3 will be also counterclockwise rotated together with the cocking member 1 and the spring 4 will be tensioned. In such case, as the clutch mechanism is incorporated in the gear train from the sector gear 3 to the star gear 10, only the sector gear or part of gears including the sector gear 3 will be idled without rotating the star gear 10. On the other hand, by the counterclockwise rotating motion of the cocking member 1, the locking of the bent portion 7b by the locking portion 1b will be released, therefore the checking member 7 will be rotated clockwise around the shaft 8 by the spring 9 and, as a result, the bent portion 7b will engage with the star gear 10 to prevent the sector gear 3 from being clockwise rotated by the spring 4. With the clockwise rotation of the checking member 7, the end portion 7c will advance into the moving track of the bent portion 12a of the interlocking member 12. Further, the locking member 5 will be rotated counterclockwise by the projected portion 7a and the bent portion 5b will also advance into the moving track of the bent portion of the interlocking member 12. Therefore, after the shutter is cocked, even if the release lever 15 is pushed in the direction indicated by the arrow in FIG. 1 to release the interlocking member 12, said member 12 will be only slightly clockwise rotated and will be stopped by the engagement of the bent portion 12a with the bent portion 5b (the position shown by the chain lines in FIG. 2). Due to this slight clockwise rotating motion of the interlocking member 12, the bent portion 12a will push the arm end 7c and therefore the checking member 7 will be rotated counterclockwise against the spring 9 (the position shown by the chain lines in FIG. 2). As a result, the bent portion 7b will separate from the star gear 10 and the sector gear 3 will be gradually rotated clockwise together with the cocking member 1 while being subjected to a braking force by the star gear 10 and anchor 11 by the resiliency accumulated in the spring 4. Meanwhile, the pin 12c will be held in a position of not contacting the locking lever 18 and therefore the shutter blade driving member 21 will not yet be released. Thus when a predetermined self-timer operating time elapses, the sector gear 3 will return to the position shown in FIG. 1, the side surface 5c of the locking member 5 will be pushed up by the pin 3a and, as a result, the bent portion 5b will be disengaged from the bent portion 12a. Therefore, the interlocking member 12 will resume the clockwise rotating motion, the pin 12c will come to rotate the locking lever 18 clockwise, therefore the driving member 21 will be released and one exposing operation will be completed as described above.

Next, the case of setting the self-timer in the using state and then releasing the setting shall be explained. This releasing operation can be made by forcibly returning the cocking member 1 to the position shown in FIG. 1 from the state shown in FIG. 2. When the self-timer is set in the using state, the cocking member 1 will be in the position shown in FIG. 2. However, when the cocking member 1 is forcibly clockwise rotated from this position, first the bent portion 1a will engage with the bent portion 5a of the locking member 5 to rotate said member 5 clockwise and then the end portion 5d of the locking member 5 will push the projected portion 7a of the checking member 7 so that said checking member 7 may be rotated counterclockwise against the spring 9. As a result, both of the bent portion 5b and arm end 7c will be retreated out of the moving track of the bent portion 12a and, on the other hand, the bent portion 7b will be disengaged from the star gear 10 and then will be checked by the locking portion 1b of the cocking member 1. Therefore, the star gear 10 will begin to rotate and the sector gear 3 will be returned to the position shown in FIG. 1. As clear from the above explanation, if the cocking member 1 is returned to the position shown in FIG. 1, the bent portion 5b of the locking member 5 and the end portion 7c of the checking member 7 will be forcibly retreated out of the moving track of the bent portion 12a of the interlocking member 12, therefore the driving member 21 will be released by the operation of the release lever 15 independently of the returning motion of the sector gear 3 and the exposure will be completed. Therefore, even after the self-timer is set in the using state, an ordinary photographing will be able to be made without missing the chance.

Figure 4:
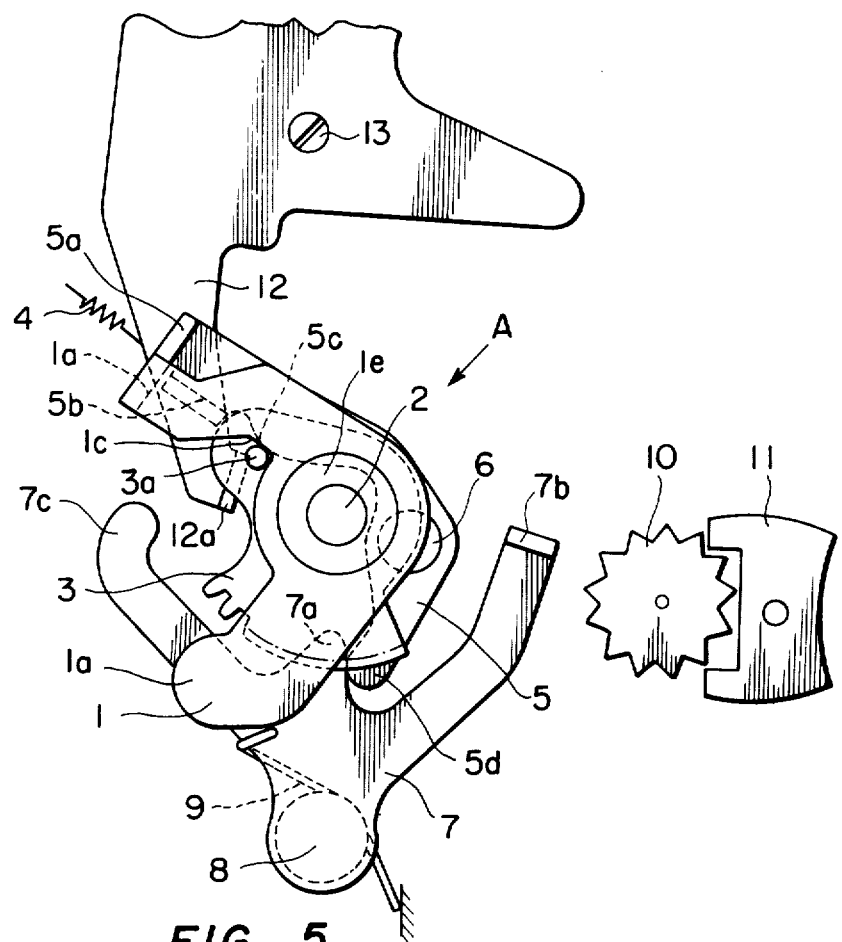
FIG. 4 is a plan view of an essential part showing another embodiment of the self-timer device according to the present invention in the same state as in FIG. 1.
Figure 5:
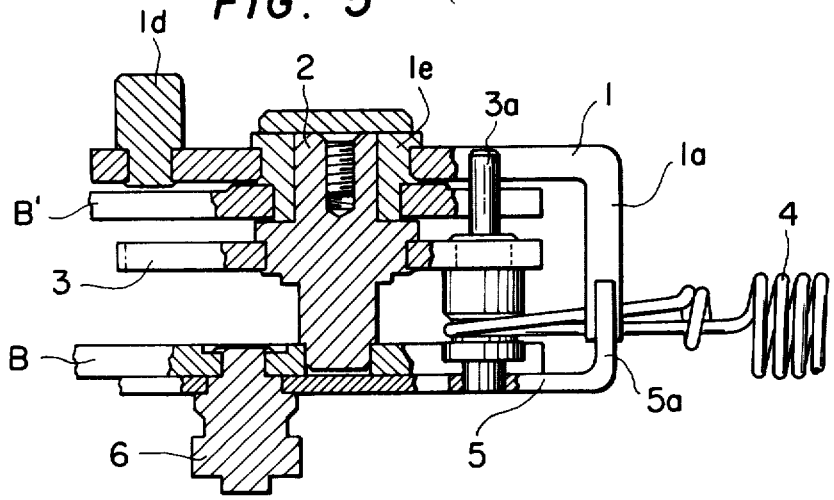
FIG. 5 is a partly sectioned side view as seen along the arrow A in FIG. 4.

FIGS. 4 and 5 show another embodiment of the self-timer according to the present invention. This embodiment is different in the structure from the embodiment shown in FIGS. 1 to 3 in respect of the below mentioned points. That is to say, according to this embodiment, an auxiliary base plate B' is provided integrally with the base plate B at a spacing from it, the shaft 2 is rotatably borne at the lower end by the base plate B, the sector gear 3 is secured to the intermediate portion of the shaft 2 and the upper end portion of the shaft 2 is rotatably fitted in a cylindrical bearing body 1e secured to the cocking member 1 and supported rotatably on the auxiliary base plate B'. By the way, the cocking member 1 has the arm part provided with the locking portion 1b cut off. In this embodiment, as the rotary shaft 2 is always pulled in one direction by the comparatively strong spring 4 through the sector gear 3, a partially comparatively large frictional force will act on each of the sliding surfaces between the bearing body 1e and auxiliary base plate B' and between the bearing body 1e and rotary shaft 2. Therefore, not only the cocking member 1 will be able to be always smoothly operated without being uselessly moved or jarred except at the operating time but also the locking member 5 and checking member 7 will be able to be positively held in the positions shown in FIG. 1 without requiring any particular locking device when the self-timer is not used.

We claim:

1. A self-timer device for cameras comprising a base plate, a sector gear supported rotatably on said base plate and movable between its cocked position and uncocked position, a gear train meshed with said sector gear and including a star gear and anchor therein, a cocking member supported rotatably relatively with said sector gear on said base plate and arranged so as to be engageable with said sector gear only when said sector gear is moved from its uncocked position to its cocked position, a checking member supported rotarably on said base plate and engageable with said star gear to stop the operation of said gear train, a locking member supported rotatably on said base plate and engaged with said cocking member and checking member, and an interlocking member supported rotatably on said base plate and arranged so as to engage with said locking member and checking member, said locking member being adapted to be movable to a position of not engaging with said interlocking member through said cocking member even after said sector gear is moved to the cocked position.

2. A self-timer device for cameras according to claim 1, in which said sector gear and cocking member are concentrically supported through a comparatively long shaft portion to produce a rotary frictional force between said sector gear and operating member.

* * * * *